United States Patent
Pun et al.

(10) Patent No.: US 8,138,963 B1
(45) Date of Patent: Mar. 20, 2012

(54) METHOD FOR DETECTING TARGETS USING SPACE-TIME ADAPTIVE PROCESSING AND SHARED KNOWLEDGE OF THE ENVIRONMENT

(75) Inventors: Man-On Pun, Jersey City, NJ (US); Zafer Sahinoglu, Boston, MA (US); Pu Wang, Ridgefield, NJ (US)

(73) Assignee: Mitsubishi Electric Research Laboratories, Inc., Cambridge, MA (US)

( * ) Notice: Subject to any disclaimer, the term of this patent is extended or adjusted under 35 U.S.C. 154(b) by 18 days.

(21) Appl. No.: 12/879,288

(22) Filed: Sep. 10, 2010

(51) Int. Cl.
*G01S 13/00* (2006.01)
*G01S 13/08* (2006.01)

(52) U.S. Cl. ......... 342/27; 342/104; 342/118; 342/147; 342/159; 342/175

(58) Field of Classification Search ............ 342/27, 342/104, 118, 147, 159, 175
See application file for complete search history.

(56) References Cited

U.S. PATENT DOCUMENTS

| | | | |
|---|---|---|---|
| 6,252,540 B1 * | 6/2001 | Hale et al. | 342/159 |
| 6,822,606 B2 * | 11/2004 | Ponsford et al. | 342/192 |
| 7,038,618 B2 * | 5/2006 | Budic | 342/195 |
| 7,079,072 B1 * | 7/2006 | Abatzoglou | 342/90 |
| 7,212,150 B2 * | 5/2007 | Blunt et a | 342/91 |
| 7,259,714 B1 * | 8/2007 | Cataldo | 342/159 |
| 7,369,083 B2 * | 5/2008 | Budic | 342/159 |
| H2222 H * | 8/2008 | Rangaswamy et al. | 342/159 |
| 7,474,258 B1 * | 1/2009 | Arikan et al. | 342/159 |
| 7,535,410 B2 * | 5/2009 | Suzuki | 342/162 |
| 2009/0027257 A1 * | 1/2009 | Arikan et al. | 342/159 |
| 2009/0237294 A1 * | 9/2009 | Shoji et al. | 342/159 |

* cited by examiner

*Primary Examiner* — Thomas Tarcza
*Assistant Examiner* — Peter Bythrow
(74) *Attorney, Agent, or Firm* — Dirk Brinkman; Gene Vinokur

(57) ABSTRACT

A method detects a target in a radar signal using space-time adaptive processing. A test statistic is $$T = \frac{\max_{\alpha}\max_{\lambda} \int_R f_1(x_0, x_1, \ldots, x_K \mid \alpha, \lambda, R) p(R) dR}{\max_{\lambda} \int_R f_0(x_0, x_1, \ldots, x_K \mid \lambda, R) p(R) dR},$$

where $x_0$ is a test signal, $x_k$ are K training signals, $\alpha$ is an unknown amplitude of a target signal within the test signal, $\lambda$ is a scaling factor, R is a covariance matrix of the training signals, and a function max returns a maximum values. The test statistic is compared to a threshold to determine whether the target is present, or not.

4 Claims, 6 Drawing Sheets

600

METHOD FOR DETECTING TARGETS USING SPACE-TIME ADAPTIVE PROCESSING AND SHARED KNOWLEDGE OF THE ENVIRONMENT

FIELD OF THE INVENTION

This invention relates generally to signal processing, and in particular to space-time adaptive processing (STAP) for target detection using radar signals.

BACKGROUND OF THE INVENTION

Space-time adaptive processing (STAP) is frequently used in radar systems to detect a target. STAP has been known since the early 1970's. In airborne radar systems, STAP improves target detection when interference in an environment, e.g., ground clutter and jamming, is a problem. STAP can achieve order-of-magnitude sensitivity improvements in target detection.

Typically, STAP involves a two-dimensional filtering technique applied to signals acquired by a phased-array antenna with multiple spatial channels. Coupling the multiple spatial channels with time dependent pulse-Doppler waveforms leads to STAP. By applying statistics of interference of the environment, a space-time adaptive weight vector is formed. Then, the weight vector is applied to the coherent signals received by the radar to detect the target.

FIG. 1 shows the signal model of the conventional STAP. When no target is detected, acquired signals 101 include a test signal $x_0$ 110 consisting of the disturbance $d_0$ 111 only, and a set of training signals $x_k$, k=1, 2, ..., K, 120, which are independent and identically distributed (i.i.d.) with the disturbance $d_0$ 111. When a target is detected, acquired signals 102 include the test signal 110 consisting of a target signal and the disturbance $d_0$ 111, and a set of i.i.d. training signals $x_k$ 120 with respect to $d_0$ 111. The target signal can be expressed as a product of a known steering vector s 130 and an unknown amplitude $\alpha$.

As shown in FIG. 2 for conventional target detection with STAP, two types of the estimation sources of the disturbance covariance matrix are usually used for a homogeneous environment where the covariance matrix of the test signal 110 is the same as that of the training signal 120. These two methods are the estimation of disturbance covariance matrix 220 from training signals 120 via a covariance matrix estimator 210, and the generation of the disturbance covariance matrix 250 from prior knowledge 230 via a covariance matrix generator 240. The knowledge database can include maps of the environment, past measurements, etc.

As shown in FIG. 3, a conventional method, known as Kelly's generalized likelihood ratio test (GLRT), takes the acquired signals including the test signal 110 and training signals 120 as input, and then determines the ratio 330 of $$\max_{\alpha} \max_{R} f_1(x_0, x_1, \ldots, x_K \mid \alpha, R) \text{ and} \qquad 310$$

$$\max_{R} f_0(x_0, x_1, \ldots, x_K \mid R), \qquad 320$$

where $\alpha$ is the amplitude of the target signal, $x_k$ are target free training signals, $x_0$ is the test signal, R is the covariance matrix of the training signals, and $f_1()$ and $f_0()$ are likelihood functions under two hypothesis $H_1$, i.e., the target is present in the test signal, and $H_0$, i.e., the target is not present in the test signal, respectively. The resulting test statistic 340 is compared to a threshold 350 to detect 360 the target.

FIG. 5 shows a conventional Bayesian treatment for the detection problem in a homogeneous environment, which assumes the disturbance covariance matrix is randomly distributed with some prior probability distribution.

Inputs are the test signal 110, the training signals 120 and a knowledge database 230. The resulting detectors are often referred to as the knowledge aided (KA) detectors for the homogeneous environment. The detector determines the ratio 530 of $$\max_{\alpha} \int_R f_1(x_0, x_1, \ldots, x_K \mid \alpha, R) p(R) \, dR \text{ and} \qquad 510$$

$$\int_R f_0(x_0, x_1, \ldots, x_K \mid R) p(R) \, dR. \qquad 520$$

The resulting test statistic T 540 is compared to a threshold 550 to detect 560 whether a target is present, or not.

For non-homogeneous environments, several models are known. One model is the well-known compound-Gaussian model, in which the training signal is a product of a scalar texture, and a Gaussian vector. The texture is used to simulate power oscillations among the signals.

Another model is the partially homogeneous environment, by which the training signals 120 share the covariance matrix with the test signal 110 up to an unknown scaling factor X.

FIG. 4 shows a conventional GLRT treatment on the detection problem, which results in the well-known adaptive coherence estimator (ACE) for the partially homogeneous environment. In that method, the input includes the acquired signals 101 comprising the test 110 and training signals 120. Then, the ratio 430 of $$\max_{\alpha} \max_{\lambda} \max_{R} f_1(x_0, x_1, \ldots, x_K \mid \alpha, \lambda, R), \text{ and} \qquad 410$$

$$\max_{\lambda} \max_{R} f_0(x_0, x_1, \ldots, x_K \mid \lambda, R) \qquad 420$$

is determined, where $\alpha$ is amplitude of the test signal, $x_k$ are target free training signals, $x_0$ is the test signal, R is the covariance matrix, $f_1()$ and $f_0()$ are the likelihood functions under two hypothesis $H_1$, i.e., the target is present in the test signal, and $H_0$, i.e., the target is not present in the test signal. The resulting test statistic 440 is compared to a threshold 450 to detect 460 the presence of a target.

SUMMARY OF THE INVENTION

The embodiments of the invention provide a method for detecting targets in radar signals using space-time adaptive processing (STAP). Different from the conventional partially homogeneous model, a stochastic partially homogeneous model is used by the embodiments of the invention, which incorporate some a priori knowledge to the partially homogeneous model. The stochastic partially homogeneous retains the power heterogeneity between the test signal and the training signals with an additional power scaling factor.

In this invention, according to the stochastic partially homogeneous model, the scale invariant generalized likelihood ratio test is developed from using Bayesian framework.

Accordingly, a likelihood function is integrated over a prior probability distribution of the covariance matrix to obtain an integrated likelihood function. Then, the integrated likelihood function is maximized with respect to deterministic but unknown parameters, a scaling factor A and a signal amplitude α.

Finally, an integrated generalized likelihood ratio test (GLRT) is derived in a closed-form. The resulting scale-invariant GLRT is a knowledge-aided (KA) version of an adaptive coherence estimator (ACE).

Specifically, our KA-ACE uses a linear combination of the sample covariance matrix and the a priori matrix $\bar{R}$ as its weighting matrix. The loading factor of $\bar{R}$ is linear with respect to the parameter μ, which reflects the accuracy of the priori matrix $\bar{R}$.

DETAILED DESCRIPTION OF THE PREFERRED EMBODIMENTS

Figure 1:
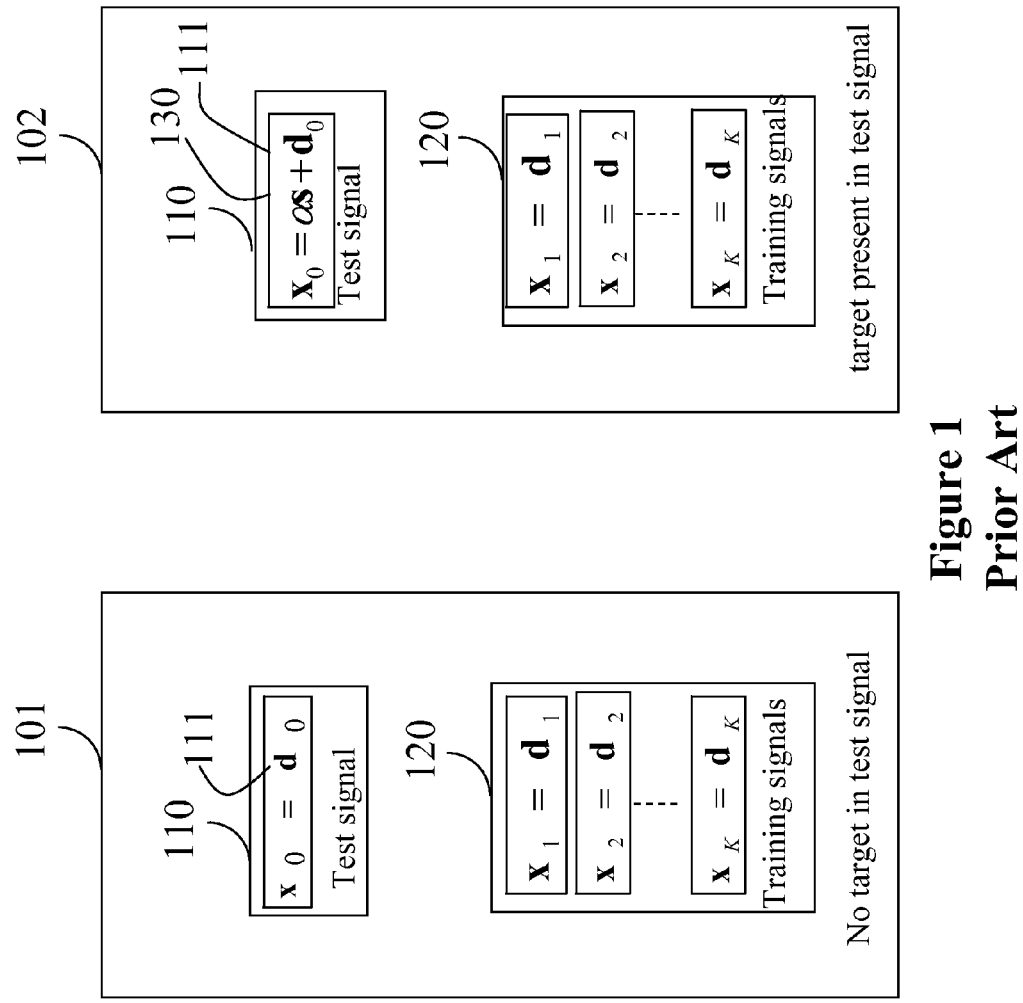
FIG. 1 is a block diagram of prior art signals when a target is present or not.
Figure 2:
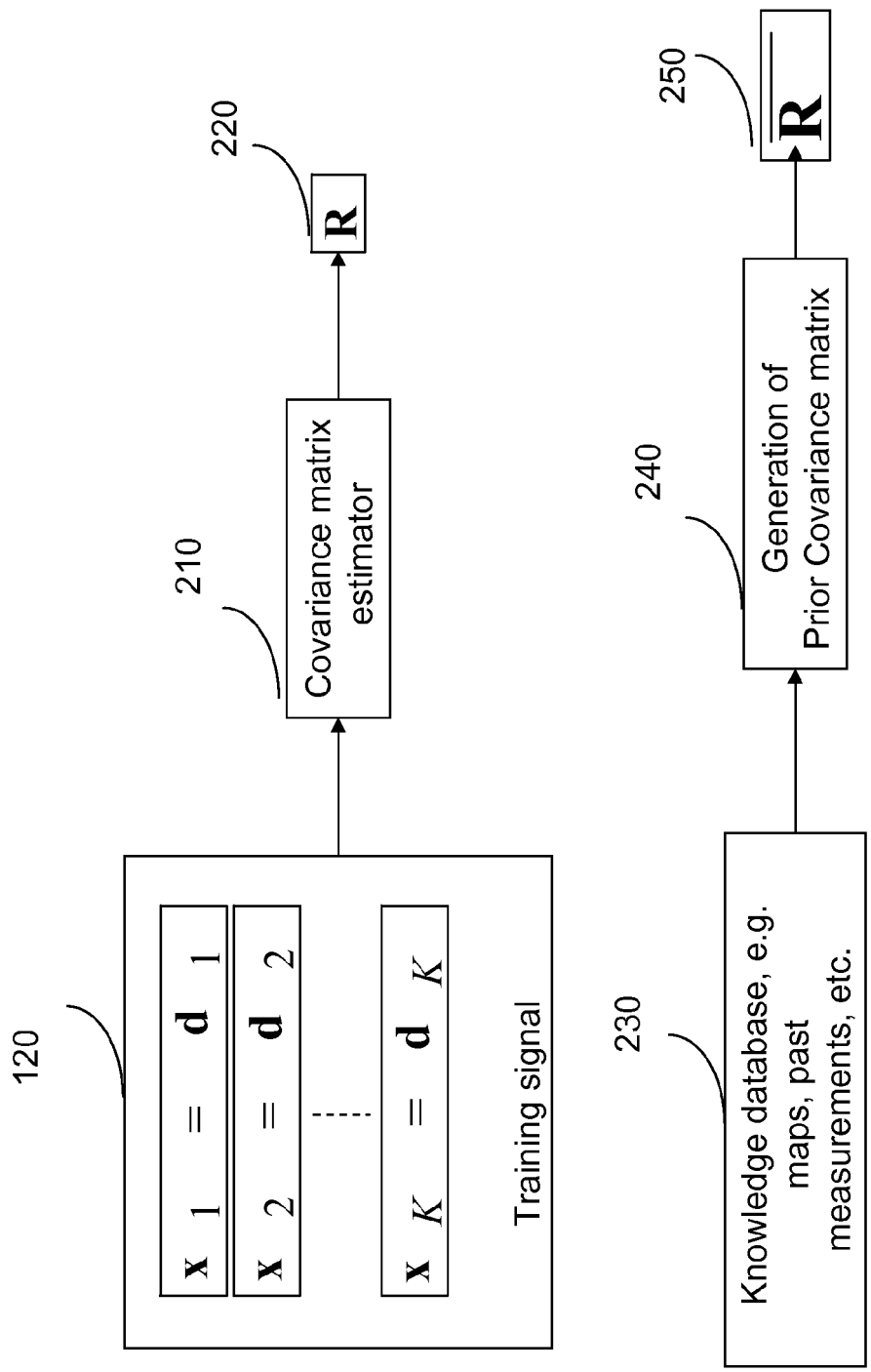
FIG. 2 is a block diagram of prior art covariances matrix estimates of background clutter from training signals and from a knowledge database via the estimates.
Figure 3:
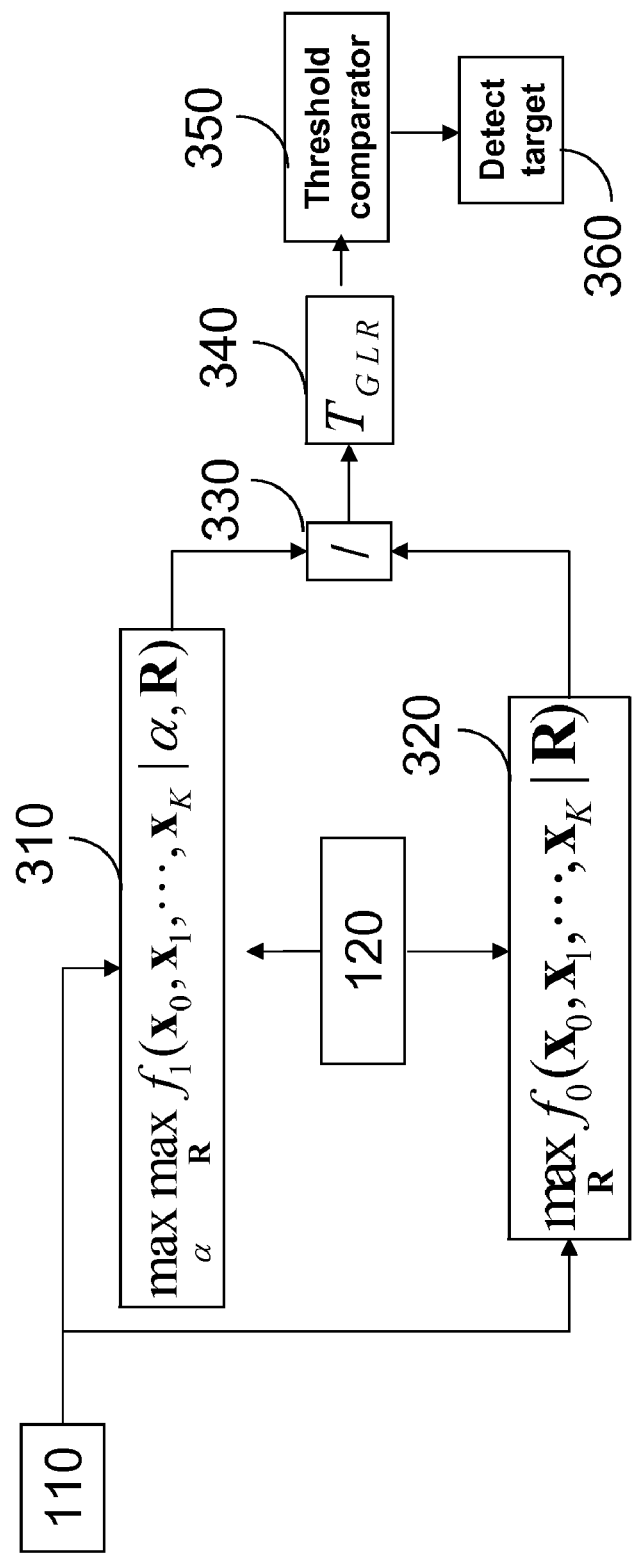
FIG. 3 is a block diagram of prior art generalized likelihood ratio test (GRLT) for homogeneous environments in the prior art.
Figure 4:
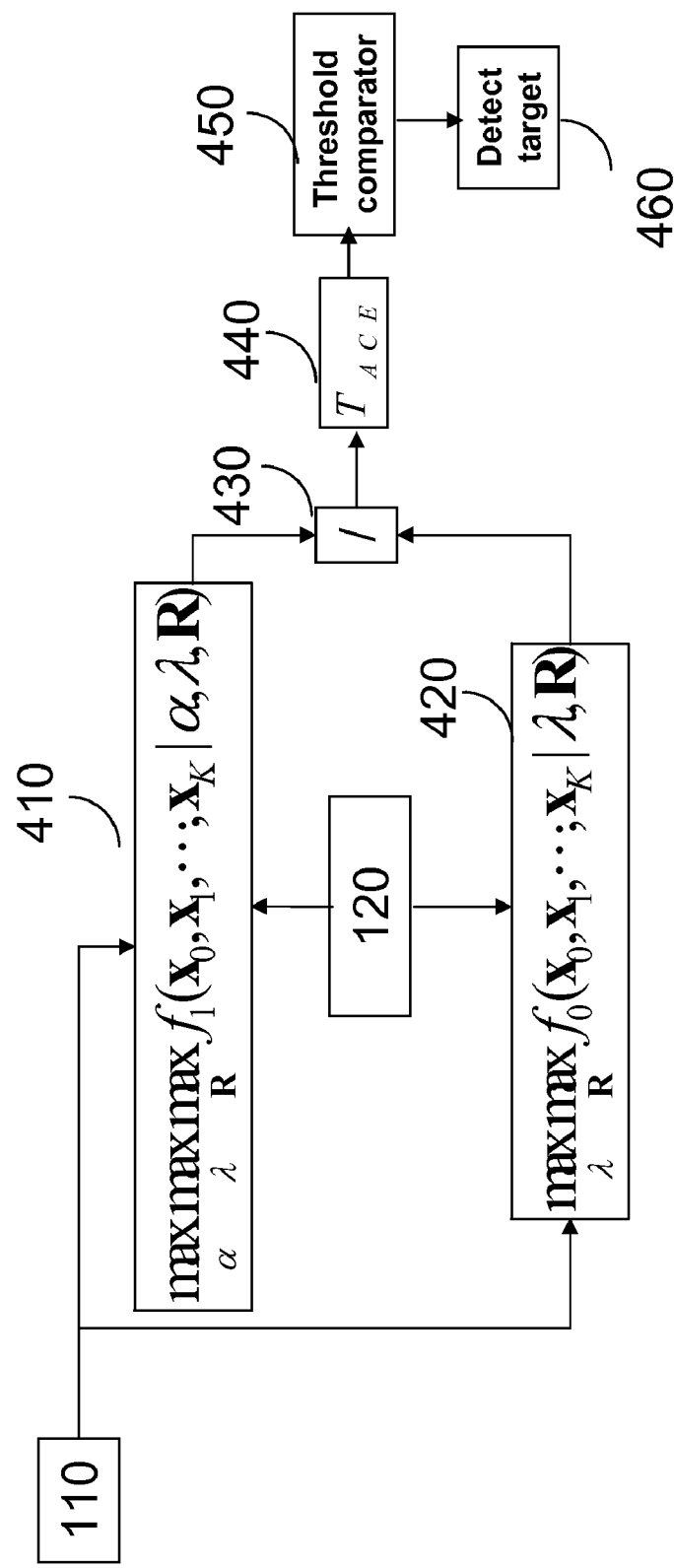
FIG. 4 is a block diagram of prior art GLRT for partially homogeneous environments, referred to as adaptive coherence estimator (ACE)
Figure 5:
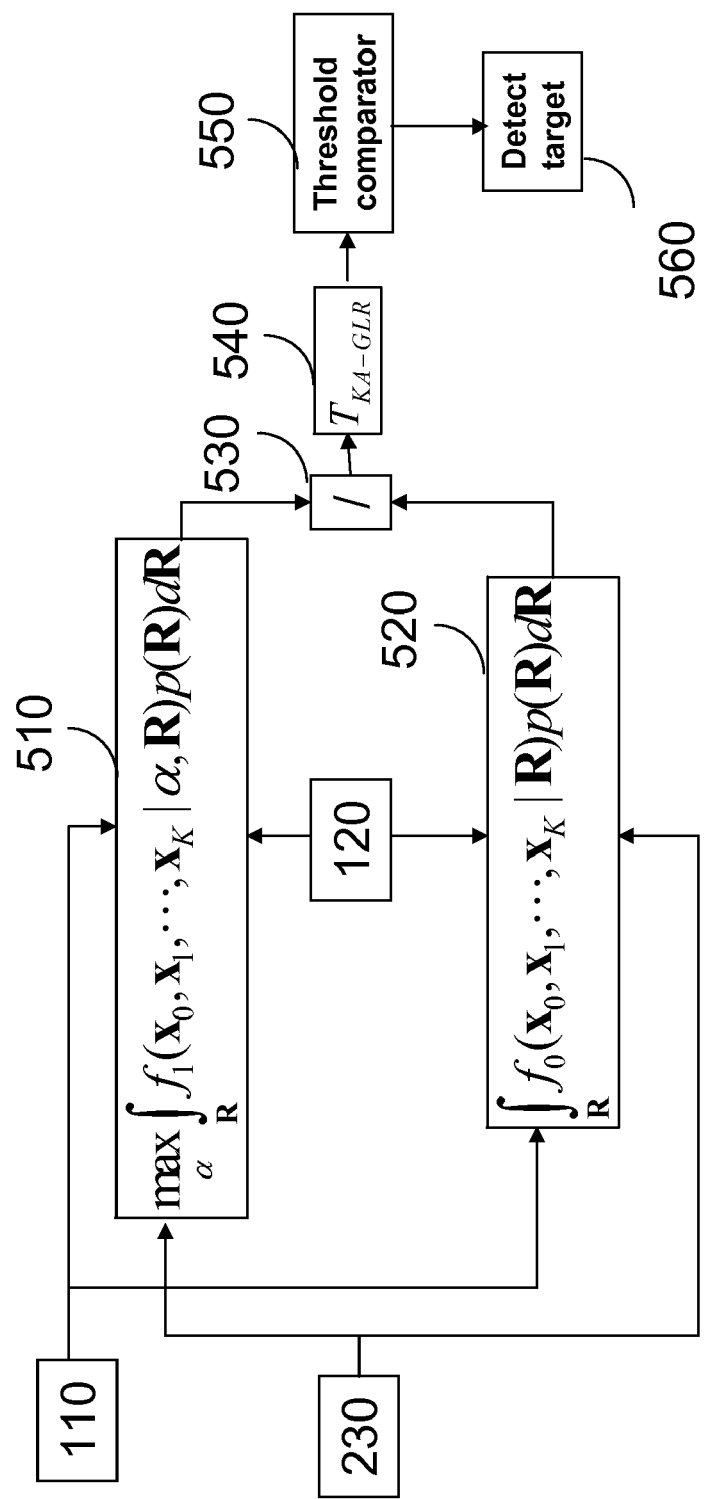
FIG. 5 is a block diagram of prior art knowledge aided GLRT for stochastic homogeneous environments.
Figure 6:
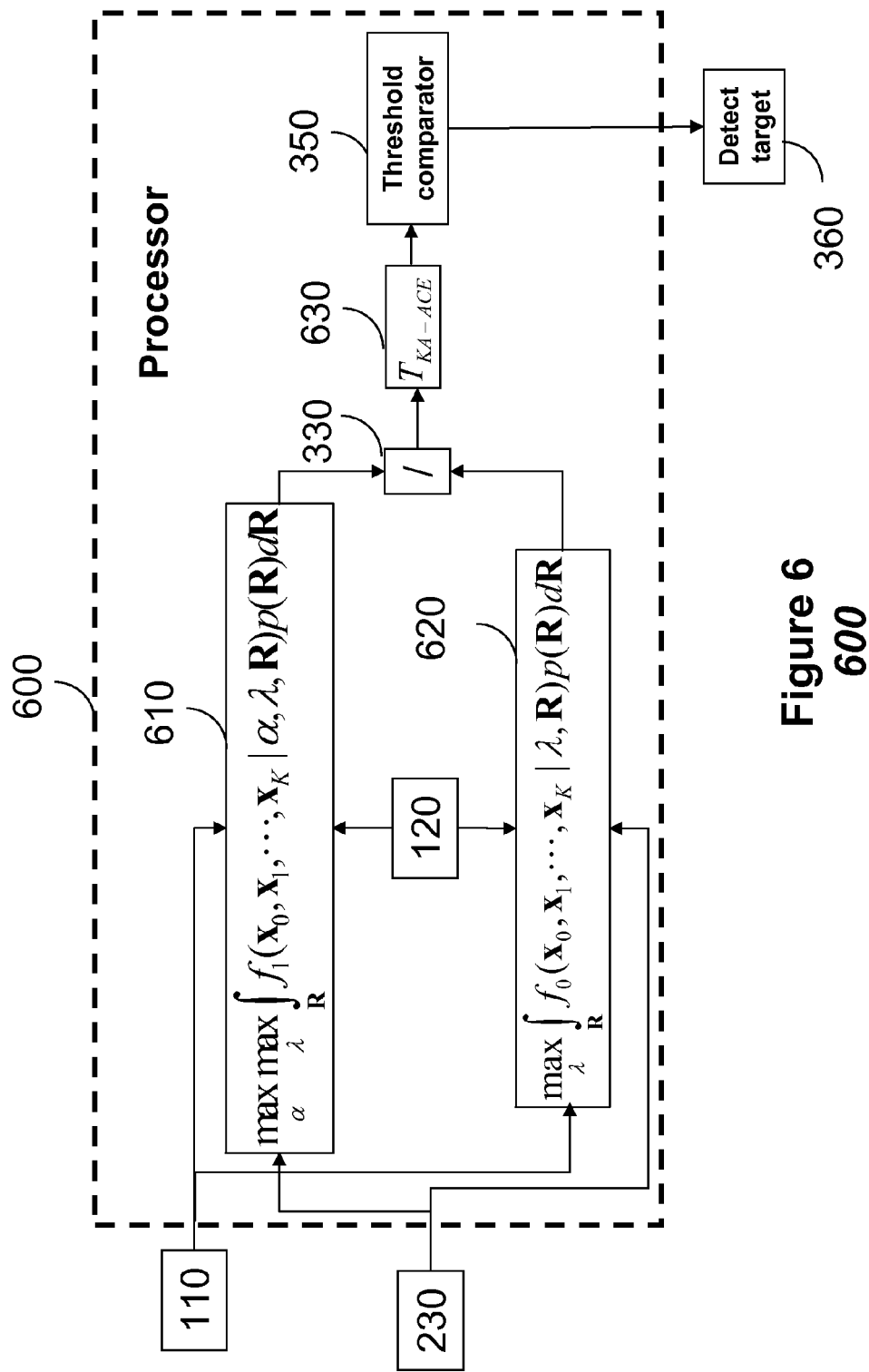
FIG. 6 is a block diagram of knowledge aided ACE for stochastic partially homogeneous environments according to embodiments of the invention.

As shown in FIG. 6, the embodiments of the invention provide a method for detecting targets using space-time adaptive processing (STAP) of test signals, and a generalized likelihood ratio test (GLRT). Our scale-invariant GLRT is a knowledge-aided (KA) version of an adaptive coherence estimator (ACE). The steps of the method can be performed in a processor 600 connected to a memory and input/output interfaces as known in the art.

Specifically, we use the following hypothesis testing problem:

$$H_0: x_0 = d_0, x_k = d_k, k=1, \ldots, K,$$

$$H_1: x_0 = \alpha s + d_0, x_k = d_k, k=1, \ldots, K, \quad (1)$$

where the hypothesis $H_0$ is that the target is not present in the test signal, $H_1$, the target is present in the test signal, $x_k$ are target free training signals 120, $x_0$ is the test signal 110, s is an array of a presumed known response, α is an unknown complex-valued amplitude of the test signal, and $d_0$ and $d_k$ are the disturbance covariance matrices $R_0$ and R of the test and training signals, respectively.

The covariance matrix R of the training signals is random and has a probability density function p(R), which is a function of the covariance matrix prior probability matrix $\bar{R}$.

A test statistic T 630 is determined from a Bayesian framework according to Equation (2), a ratio 330 of 610 to 620, and a scaling factor λ

$$T = \frac{\max_\alpha \max_\lambda \int_R f_1(x_0, x_1, \ldots, x_K \mid \alpha, \lambda, R) p(R) dR}{\max_\lambda \int_R f_0(x_0, x_1, \ldots, x_K \mid \lambda, R) p(R) dR}, \quad (2)$$

wherein a function max returns a maximum value, and λ can be in a range of about [1-16].

The GRLT in Equation (2) can be reduced to $$T = \frac{\max_\alpha \max_\lambda \lambda^{-N} \left|\bar{\Sigma}_1\right|^{-L}}{\max_\lambda \lambda^{-N} \left|\bar{\Sigma}_0\right|^{-L}}, \quad (3)$$

where L=K+μ+1, and $$\Sigma_i = \tau_i + (\mu-N)\bar{R} = \lambda^{-1} y_i y_i^H + S + (\mu-N)\bar{R}$$

with $$y_i = x_0 - \beta_i \alpha s, \beta_1 = 1, \beta_0 = 0,$$

and $$S = \sum_{k=1}^{K} x_k x_k^H.$$

After deriving and substituting the maximum likelihood estimate of the scalar λ into Equation (3), the our test statistics T becomes $$T = \max_\alpha \frac{\hat{\lambda}_{ML,0}^N \left|\bar{\Sigma}_0(\hat{\lambda}_{ML,0})\right|^L}{\hat{\lambda}_{ML,1}^N \left|\bar{\Sigma}_1(\alpha, \hat{\lambda}_{ML,1})\right|^L} = \left[\frac{x_0^H \Gamma^{-1} x_0}{\min_\alpha (x_0 - \alpha s)^H \Gamma^{-1}(x_0 - \alpha s)}\right]^N. \quad (4)$$

Next, the amplitude α in Equation (4) is replaced by a maximum likelihood estimate of the amplitude α according to $$\hat{\alpha}_{ML} = \frac{s^H \Gamma^{-1} x_0}{s^H \Gamma^{-1} s}. \quad (5)$$

Taking the $N^{th}$ square root of Equation (4) and using monotonic properties of the function $f(x)=1/(1-x)$, the new test statistic 630 is $$T_{KA\text{-}ACE} = \frac{|s^H \Gamma^{-1} x_0|^2}{(s^H \Gamma^{-1} s)(x_0^H \Gamma^{-1} x_0)} \underset{H_0}{\overset{H_1}{\gtrless}} \gamma_{KA\text{-}ACE} \quad (6)$$

where γKA-ACE denotes a threshold subject to a probability of a false alarm.

The KA-ACE for the stochastic partially homogeneous environment takes the form of the standard ACE, except that the whitening matrix is $$\Gamma = S + (\mu - N)\bar{R} = \sum_{k=1}^{K} x_k x_k^H + (\mu - N)\bar{R}, \quad (7)$$

which uses a linear combination between the sample covariance matrix S and the prior knowledge covariance matrix $\bar{R}$. The weighting factor of the prior knowledge is controlled by $\mu$. It makes sense that the KA-ACE puts more weights on the prior matrix $\bar{R}$, when the prior matrix is more accurate, i.e., $\mu$ is relatively large.

In comparison, the conventional ACE also takes the same form, but with the whitening matrix given by the sample covariance matrix=$\Gamma$=S. The statistic is finally compared to a threshold 350 to detect 360 whether a target signal 130 is present in the test signal 110.

Effect of the Invention

The embodiments of the invention provide a method for detecting targets. A knowledge-aided adaptive coherence estimator ACE is provided for a stochastic partially homogeneous environment, which models the power oscillation between the test and the training signals and treats the disturbance covariance matrix as a random matrix.

The KA-ACE has a color-loading form between the sample covariance matrix and the prior knowledge used for the whitening matrix. We note that the KA-ACE is scale invariant and performs better than the conventional ACE in various applications.

Although the invention has been described by way of exes of preferred embodiments, it is to be understood that various other adaptations and modifications may be made within the spirit and scope of the invention. Therefore, it is the object of the appended claims to cover all such variations and modifications as come within the true spirit and scope of the invention.

We claim:

1. A method for detecting a target in a radar signal using space-time adaptive processing, comprising the steps:

using an electronic processor for determining a test statistic $$T = \frac{\max_{\alpha} \max_{\lambda} \int_R f_1(x_0, x_1, \ldots, x_K \mid \alpha, \lambda, R) p(R) dR}{\max_{\lambda} \int_R f_0(x_0, x_1, \ldots, x_K \mid \lambda, R) p(R) dR},$$

where $x_0$ is a test signal, $x_k$ are K training signals, $\alpha$ is an unknown amplitude of a target signal within the test signal, $\lambda$ is a scaling factor, R is a covariance matrix of the training signals, and a function max returns a maximum values; and comparing the test statistic to a threshold to determine whether the target is present, or not.

2. The method of claim 1, wherein a hypothesis testing problem is used as follows $H_0: x_0 = d_0, x_k = d_k, k=1, \ldots, K,$ $H_1: x_0 = a\alpha s + d_0, x_k d_k, k=1, \ldots, K,$ where a hypothesis $H_0$ is that the target is not present in the test signal, a hypothesis $H_1$ is that the target is present in the test signal, and $d_0$ and $d_k$ are noise terms for covariance matrices of the test signal and training signals, respectively.

3. The method of claim 1, wherein the covariance matrix R is random and has a probability density function p(R), which is a function of a covariance matrix prior probability matrix $\bar{R}$.

4. The method of claim 1, further comprising:

replacing the unknown amplitude $\alpha$ by a maximum likelihood estimate of the amplitude $\alpha$.

\* \* \* \* \*